United States Patent
Nishiuchi et al.

(10) Patent No.: US 6,975,579 B2
(45) Date of Patent: Dec. 13, 2005

(54) OPTICAL INFORMATION RECORDING MEDIUM AND OPTICAL INFORMATION RECORDING AND REPRODUCING APPARATUS

(75) Inventors: Kenichi Nishiuchi, Moriguchi (JP); Naoyasu Miyagawa, Suita (JP); Eiji Ohno, Hirakata (JP); Nobuo Akahira, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 19 days.

(21) Appl. No.: 10/702,750

(22) Filed: Nov. 6, 2003

(65) Prior Publication Data

US 2004/0090885 A1 May 13, 2004

Related U.S. Application Data

(62) Division of application No. 10/338,098, filed on Jan. 6, 2003, now Pat. No. 6,667,937, which is a division of application No. 10/108,283, filed on Mar. 26, 2002, now Pat. No. 6,532,209, which is a continuation of application No. 08/598,815, filed on Feb. 9, 1996, now Pat. No. 6,411,592, which is a division of application No. 08/425,902, filed on Apr. 20, 1995, now Pat. No. 5,568,461.

(30) Foreign Application Priority Data

Apr. 20, 1994 (JP) .............................................. 6-81533

(51) Int. Cl.⁷ ................................................ G11B 7/24
(52) U.S. Cl. ............................... 369/275.4; 369/275.3; 369/44.26
(58) Field of Search .......................... 369/275.1, 275.2, 369/275.3, 275.4, 275.5, 44.26, 44.29, 44.35, 44.36, 124.11, 44.25, 13.55, 13.24, 53.37, 59.1, 47.53, 279, 277, 278

(56) References Cited

U.S. PATENT DOCUMENTS 4,423,502 A    12/1983   Dil (Continued)

FOREIGN PATENT DOCUMENTS

JP    1-122034    5/1989

(Continued)

OTHER PUBLICATIONS

Miyagawa, N., et al. "Land and Groove Recording for High Track Density on Phase–Change Optical Disks", *Japanese Journal of Applied Physics*, vol. 32, pp. 5324–5328 (1993).

(Continued)

*Primary Examiner*—Ali Neyzari
(74) *Attorney, Agent, or Firm*—RatnerPrestia

(57) ABSTRACT

An optical information recording and reproducing apparatus for recording and reproducing an information signal on/from both concave portions and convex portions of guide grooves formed on a recording medium is disclosed. The optical information recording and reproducing apparatus includes: an optical portion for focusing a light beam emitted from a light source on the recording medium; a focusing control portion for controlling a focal point of the light beam; a tracking control portion for controlling the position of the light beam; a selection portion for selecting which of the concave portions and the convex portions of the guide grooves are used for recording or reproducing; a polarity inverting portion for inverting the polarity of an output signal from the tracking control portion depending on a result selected by the selection portion; a waveform setting portion for setting a modulation pattern for the light; and a signal reproduction portion for demodulating the information signal from a light reflected or transmitted by recorded marks recorded on the recording medium; wherein at least one of the focusing control portion, the tracking control portion, the waveform setting portion and the signal reproduction portion has at least two kinds of operation conditions for recording and reproducing the information signal on/from the concave portions and the convex portions of the guide grooves, and wherein the operation conditions are selected depending on the result selected by the selection portion.

3 Claims, 13 Drawing Sheets

U.S. PATENT DOCUMENTS

| | | |
|---|---|---|
| 4,858,218 A | 8/1989 | Takagi et al. |
| 5,126,989 A | 6/1992 | Tinet |
| 5,132,952 A | 7/1992 | Tinet |
| 5,138,594 A | 8/1992 | Fennema et al. |
| 5,144,552 A | 9/1992 | Abe |
| 5,199,022 A | 3/1993 | Suzuki et al. |
| 5,251,194 A | 10/1993 | Yoshimoto et al. |
| 5,329,512 A | 7/1994 | Fukimoto et al. |
| 5,404,345 A | 4/1995 | Taki |
| 5,414,652 A | 5/1995 | Mieda et al. |
| 5,448,552 A | 9/1995 | Onagi |
| 5,452,284 A | 9/1995 | Miyagawa et al. |
| 5,475,664 A | 12/1995 | Shimizume et al. |
| 5,493,552 A | 2/1996 | Kobori |
| 5,544,137 A | 8/1996 | Ohara et al. |
| 5,568,461 A | 10/1996 | Nishiuchi et al. |
| 5,579,294 A | 11/1996 | Ohta et al. |
| 5,764,619 A * | 6/1998 | Nishiuchi et al. ........ 369/275.1 |
| 5,905,700 A | 5/1999 | Best et al. |
| 5,999,502 A | 12/1999 | Nakata et al. |
| 6,411,592 B1 | 6/2002 | Nishiuchi et al. |
| 6,434,095 B1 * | 8/2002 | Nishiuchi et al. ........ 369/44.27 |
| 6,532,209 B2 | 3/2003 | Nishiuchi et al. |
| 6,771,587 B2 * | 8/2004 | Nishiuchi et al. ........... 369/283 |

FOREIGN PATENT DOCUMENTS

| | | |
|---|---|---|
| JP | 6-84194 | 3/1994 |
| JP | 7-121878 | 5/1995 |
| JP | 63-57859 | 11/1998 |

OTHER PUBLICATIONS

Kayanuma, K., et al., "High Track Density Magneto–Optical Recording Using a Crosstalk Canceler", SPIE–Optical Storage, vol. 1316, pp. 35–39 (1990).

Iwanaga, T., et al., "High Density Land/Groove Recording for Digital Video File System", *Japanese Journal of Applied Physics*, vol. 32, pp. 5449–5450 (1993).

\* cited by examiner

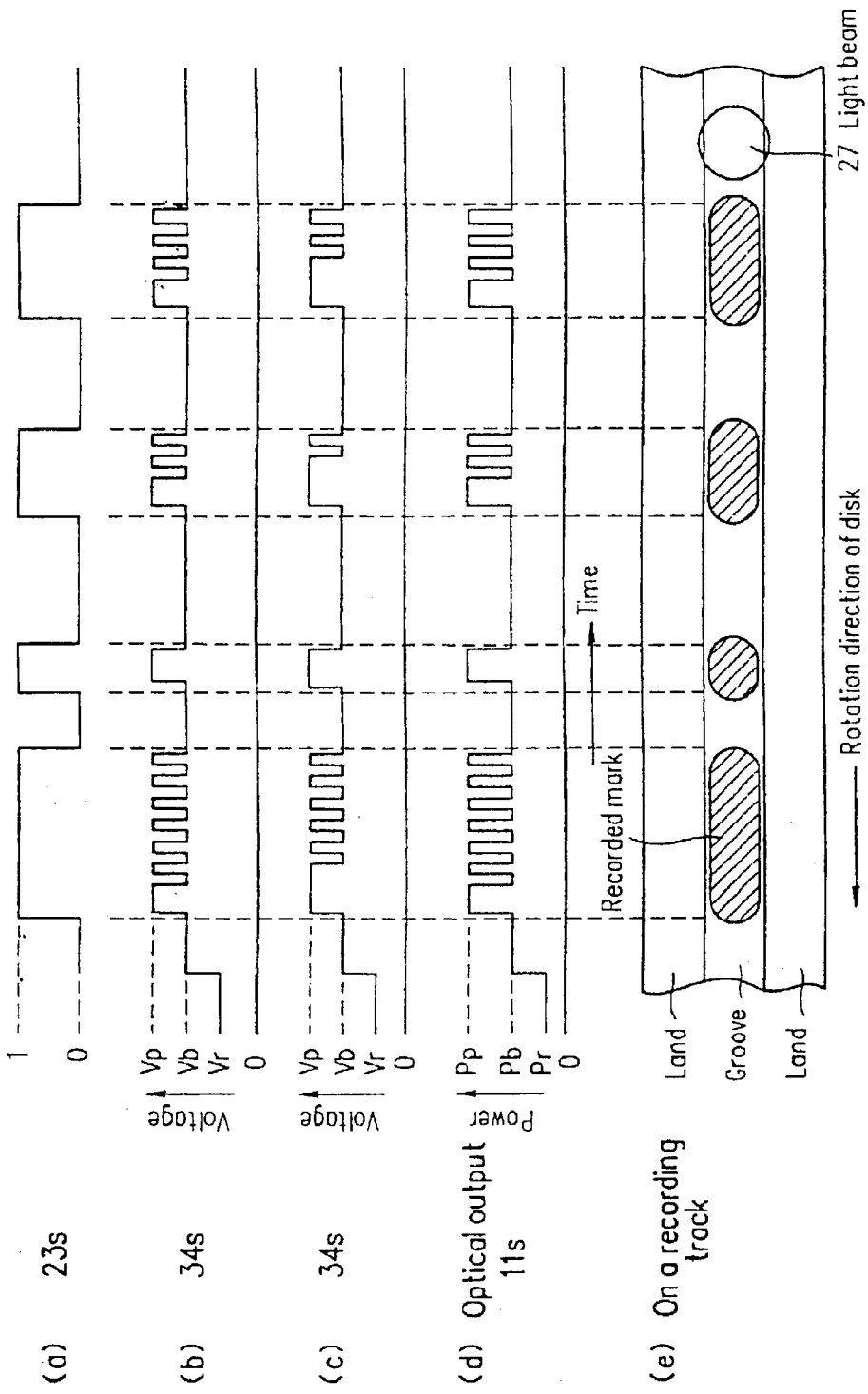

OPTICAL INFORMATION RECORDING MEDIUM AND OPTICAL INFORMATION RECORDING AND REPRODUCING APPARATUS

This application is a divisional of U.S. patent application Ser. No. 10/338,098 filed Jan. 6, 2003 now U.S. Pat. No. 6,667,937, which is a divisional of U.S. patent application Ser. No. 10/108,283 filed Mar. 26, 2002 now U.S. Pat. No. 6,534,209, which is a continuation of U.S. patent application Ser. No. 08/598,815 filed Feb. 9, 1996, now U.S. Pat. No. 6,411,592, which is a divisional of 08/425,902, filed Apr. 20, 1995 now U.S. Pat. No. 5,568,461. The entire disclosure of U.S. patent application Ser. No. 10/338,098, filed Jan. 6, 2003, is expressly incorporated herein by reference.

BACKGROUND OF THE INVENTION

1. Field of the Invention

The present invention relates to an optical information recording medium and an optical information recording and reproducing apparatus for recording and reproducing information by using a light beam. More particularly, the present invention relates to an optical information recording medium and an optical information recording and reproducing apparatus allowing for obtaining a higher track density by recording a signal on both lands and grooves of the guide grooves thereof.

2. Description of the Related Art

Optical disks, optical cards, optical tapes and the like are well-known as recording mediums (or recording members) for recording and/or reproducing information by the use of an optical means. In order to record information on such a recording medium, a laser beam is generally used as a light source. More specifically, information is recorded by precisely focusing a light beam through a lens so as to irradiate the light beam on a recording thin film of the recording medium.

An optical disk, one of the above-cited recording media, includes a circular substrate on which spiral or concentric guide grooves having a plurality of convex portions and concave portions are provided, and a recording thin film formed thereon. By irradiating a light beam, which is intensity-modulated in accordance with each information signal, along the direction of these guide grooves, information is recorded on the recording thin film.

The recording thin film is required to exhibit such characteristics that the physical properties thereof are varied upon the irradiation of light, and that the difference between the states before and after the variation may be optically detected. The variations in the physical properties of the recording thin film, are for example, the deformation of the thin film owing to the absorption of the light, the phase change of the thin film owing to the light irradiation, and the like. The recording media showing such variations are known as a deformation type recording medium and phase-change type recording medium, respectively. A signal indicating the variations of the physical, properties as difference in the amounts of the reflected light is reproduced.

A magnetooptic recording medium is also well-known as another optical type recording medium. In a magnetooptic recording medium, information is recorded thereon by the application of a magnetic field as well as light irradiation, and the difference in the magnetization directions on the recording thin film is detected by utilizing a Kerr effect, thereby reproducing a signal.

Optical type recording media such as those described above have been put into practical use depending on the respective applications thereof. In addition, in order to further increase the memory capacity for information, various kinds of researches on the increase of the recording density have been earnestly conducted.

As an exemplary method for increasing the recording density of an optical type recording medium, a method for recording a signal both on the convex portions and concave portions of the guide grooves is proposed so as to replace a conventional method for recording a signal on either the convex portions or the concave portions of the guide grooves (e.g., Japanese Journal of Applied Physics, Vol. 32 (1993), pp. 5324–5328). According to the method disclosed therein, by using a substrate in which the width of a concave portion of each guide groove is approximately equal to that of a convex portion thereof, and the depth of the concave portion is optimized, an information signal may be recorded and reproduced on/from both of the concave portion and the convex portion. In this specification, a convex portion with respect to the light incident direction is called a "groove", and the operation of recording information on a convex portion is called a "groove recording". In the same way, a concave, portion with respect to the light incident direction is called a "land", and the operation of recording information on a concave portion is called a "land recording". If a method for recording a signal on both of lands and grooves is employed, a track density is considered to become double as compared with a conventional method in which information is recorded on either one side of each guide groove.

In recording and reproducing information in accordance with this method, the same kinds of optical systems and optical type recording systems as conventional ones may be used in principle. This method may be realized easily by additionally providing a tracking polarity switching means so as to correspond to each concave portion and each convex portion of the guide grooves, and by irradiating an intensity-modulated light beam on the two kinds of regions based on the information signals. However, the comparison of the two kinds of signals recorded on the two kinds of portions of the recording medium reveals that difference exists in the amplitude and the frequency characteristics of the two kinds of reproduced signals corresponding to a land and a groove, respectively. Such difference in the amplitude of the signals is also caused depending on the configuration of the respective recording thin films. Therefore, even if a signal recording may be satisfactorily performed on either one of a land track and a groove track during a step of demodulating a reproduced signal, a great deal of error is generated on the other kind of track in some cases. Also, even in recording thin films having the same configuration, if the shape of the edges of the guide grooves or the groove width become different from each other, the levels of the reproduced signals become different on the two kinds of tracks.

Accordingly, in a conventional recording medium for performing a land/groove recording, there exists problems to be solved in that the configuration of a recording thin film is required to be optimized and that the guide grooves on the substrate must be shaped with high precision.

SUMMARY OF THE INVENTION

An optical information recording and reproducing apparatus for recording and reproducing an information signal on/from both concave portions and convex portions of guide grooves formed on a recording medium is provided. The recording medium has: a substrate on which the guide grooves consisting of the concave portions and the convex portions are formed; and a recording thin film, formed on the guide grooves, on which variations to be detected optically are generated by irradiation of light is provided. The optical information recording and reproducing apparatus of the invention includes: an optical portion, having a light source, for focusing a light beam emitted from the light source on the recording medium using an objective lens; a focusing control portion for controlling so as to make a focal point of the light beam correspond to a position of the recording thin film; a tracking control portion for controlling a position of the light beam in a direction substantially vertical to the guide grooves so that the light beam tracks the guide grooves; a selection portion for selecting which of the concave portions and the convex portions of the guide grooves are used for recording a information signal thereon or reproducing a recorded information signal therefrom; a polarity inverting portion for inverting the polarity of an output signal from the tracking control portion depending on a result selected by the selection portion; a waveform setting portion for setting a modulation pattern for the light beam to be irradiated on the recording medium in accordance with the information signal; and a signal reproduction portion for demodulating the information signal from a light reflected or transmitted by recorded marks recorded on the recording medium; wherein at least one of the focusing control portion, the tracking control portion, the waveform setting portion and the signal reproduction portion has at least two kinds of operation conditions for recording and reproducing the information signal on/from the concave portions and the convex portions of the guide grooves, and wherein the operation conditions are selected depending on the result selected by the selection portion.

According to another aspect of the invention, an optical information recording and reproducing apparatus includes: an optical portion, having a light source, for focusing a light beam emitted from the light source on the recording medium using an objective lens; a focusing control portion for controlling so as to make a focal point of the light beam correspond to a position of the recording thin film; a tracking control portion for controlling the position of the light beam in a direction substantially vertical to the guide grooves so that the light beam tracks the guide grooves; a selection portion for selecting which of the concave portions and the convex portions of the guide grooves are used for recording the information signal thereon or reproducing a recorded information signal therefrom; a polarity inverting portion for inverting the polarity of an output signal from the tracking control portion depending on a result selected by the selection portion; and an optical modulation portion including a waveform setting portion having at least two kinds of modulation patterns in accordance with the information signal in order to record the information signal on each of the concave portions and the convex portions of the guide grooves so as to output any of the modulation patterns depending on the result selected by the selection portion, wherein the optical modulation portion modulates an intensity of the light beam in accordance with the modulation patterns output from the waveform setting portion.

In one embodiment of the invention, the waveform setting portion has a multiple pulse modulation function for irradiating a light consisting of a plurality of pulse sequences onto one recorded mark to be recorded on the recording medium, and wherein waveforms of the plurality of pulse sequences are different from each other among the at least two kinds of modulation patterns of the waveform setting portion.

In one embodiment of the invention, the said at least two kinds of modulation patterns of the waveform setting portion vary the power of the light beam.

In one embodiment of the invention, the recording and reproducing apparatus further includes a signal reproduction portion for demodulating the information signal from a light reflected or transmitted by recorded marks recorded on the recording medium, wherein before recording the information signal on the recording medium, the waveform setting portion includes a recording condition setting portion in which a plurality of pulse patterns are stored in order to irradiate the light beam having different modulation patterns onto the concave portions and/or the convex portions of the guide grooves in a test zone close to an information zone on the recording medium; and wherein a plurality of recorded marks are formed on the recording medium by irradiating the light beam modulated by the optical modulation portion in accordance with the plurality of pulse patterns, information signals to be obtained from the plurality of recorded marks formed on the recording medium are demodulated by the signal reproduction portion, and qualities of a plurality of reproduced signals obtained by the signal reproduction portion are compared with each other, thereby determining recording conditions optimized for the concave portions and the convex portions of the guide grooves.

In one embodiment of the invention, the recording and reproducing apparatus further includes a recording condition identifying portion for reading a recording condition identifier, provided in a particular zone other than the information zone on the recording medium, for correcting a difference between characteristics of the concave portions and those of the convex portions of the guide grooves, wherein the wave form setting portion is operated depending on information read by the recording condition identifying portion.

According to still another aspect of the invention, an optical information recording and reproducing apparatus includes: a selection portion for selecting which of the concave portions and the convex portions of the guide grooves are used for recording the information signal thereon or reproducing a recorded information signal therefrom; an optical portion, having a light source, for focusing a light beam emitted from the light source on the recording medium using an objective lens; a focusing control portion, including an offset setting portion for supplying offsets having at least two levels to the concave portions and the convex portions of the guide grooves, for controlling so as to make a focal point of the light beam correspond to a position of the recording thin film by using the offsets selected depending on a result selected by the selection portion; a tracking control portion for controlling the position of the light beam in a direction substantially vertical to the guide grooves so that the light beam tracks the guide grooves; and a polarity inverting portion for inverting the polarity of an output signal from the tracking control portion depending on the result selected by the selection portion.

In one embodiment of the invention, the recording and reproducing apparatus further includes a signal reproduction portion for demodulating an information signal from a light reflected or transmitted by recorded marks recorded on the recording medium, wherein the focusing control portion includes a focusing condition setting portion in which a plurality of offset levels for recording and reproducing the information signal are stored, and wherein before recording and reproducing the information signal on/from the recording medium, a plurality of recorded marks are formed in a test zone close to an information zone on the recording medium by irradiating the light beam onto the concave portions and/or the convex portions of the guide grooves using the plurality of offset levels, a plurality of reproduced signals to be obtained from the plurality of recorded marks formed on the recording medium are demodulated by the signal reproduction portion using the light beam, and qualities of the plurality of reproduced signals obtained by the signal reproduction portion are compared with each other, thereby determining recording conditions optimized for the concave portions and the convex portions of the guide grooves.

In one embodiment of the invention, the recording and reproducing apparatus further includes a signal reproduction portion for demodulating an information signal from a light reflected or transmitted by recorded marks on the recording medium, wherein the focusing control portion includes a focusing condition setting portion in which a plurality of offset levels for recording and reproducing the information signal are stored, and wherein before recording or reproducing the information signal on/from the recording medium, information signals to be obtained from reference recorded marks formed in a test zone close to an information zone on the recording medium are demodulated by the signal reproduction portion using the light beam with the plurality of offset levels, and qualities of a plurality of reproduced signals obtained by the signal reproduction portion are compared with each other, thereby determining reproducing conditions optimized for the concave portions and the convex portions of the guide grooves.

In one embodiment of the invention, the recording and reproducing apparatus further includes a jumping portion for moving the light beam by a half track from a concave portion of the recording medium to a convex portion adjacent to the concave portion, or from a convex portion to a concave portion in association with an operation of the polarity inverting portion, wherein an offset at a level between a level of an offset of the focusing control portion with respect to the concave portions of the recording medium and a level of an offset of the focusing control portion with respect to the convex portions of the recording medium is used during an operation of the jumping portion.

In one embodiment of the invention, the tracking control portion comprises a second offset setting portion for supplying at least two offset levels, and wherein the offset levels of the second offset setting portion are switched depending on a result selected by the selection portion.

According to still another aspect of the invention, an optical information recording and reproducing apparatus includes: an optical portion, having a light source, for focusing a light beam emitted from the light source on the recording medium using an objective lens; a focusing control portion for controlling so as to make a focal point of the light beam correspond to a position of the recording thin film; a tracking control portion for controlling a position of the light beam in a direction substantially vertical to the guide grooves so that the light beam tracks the guide grooves; a selection portion for selecting which of the concave portions and the convex portions of the guide grooves are used for recording the information signal thereon or reproducing a recorded information signal therefrom; a polarity inverting portion for inverting the polarity of an output signal from the tracking control portion depending on the result selected by the selection portion; and a signal reproduction portion for demodulating the information signal from a light reflected or transmitted by recorded marks recorded on the recording medium in the concave portions and the convex portions of the guide grooves by switching at least two demodulation conditions depending on the result selected by the selection portion.

In one embodiment of the invention, the mentioned at least two demodulation conditions are equalizing conditions having different amplification characteristics with respect to a frequency.

In one embodiment of the invention, the signal reproduction portion includes at least two level setters for generating reference signals at different levels and a comparator for comparing the information signal from the recording medium with one of the reference signals, and wherein the said at least two demodulation conditions are the reference signals for binary coding.

In one embodiment of the invention, before demodulating the information signal from the recording medium, signals to be obtained from reference recorded marks formed in the concave portions and the convex portions of the guide grooves in a test zone close to an information zone on the recording medium are reproduced; the signals are demodulated by gradually varying demodulation conditions of the signal reproduction portion; and then the demodulated signals are compared with each other, thereby determining optimal demodulation conditions.

According to still another aspect of the invention, an optical information recording medium includes: a substrate having guide grooves consisting of concave portions and convex portions thereon; a recording thin film, provided on the substrate, on which variations to be detected optically are generated by irradiation of light; and land/groove identifiers, provided in a particular zone other than an information zone on the recording thin film, for indicating differences between characteristics of the concave portions and those of the convex portions of the guide grooves.

In one embodiment of the invention, the land/groove identifiers include information indicating irradiation conditions of light during a recording operation.

In one embodiment of the invention, the land/groove identifiers include identifiers consisting of information about groove shapes of the concave portions and the convex portions of the guide grooves.

In one embodiment of the invention, the land/groove identifiers are reference record signals, provided on the concave portions and the convex portions of the guide grooves in a test zone close to an information zone on the same plane of the recording medium, for determining reproduction conditions of the information signal recorded in the information zone.

According to the present invention, the recording conditions are varied depending on which of the concave portions and the convex portions of the guide grooves are tracked, so that a recording may be performed while compensating for the difference between the heating/cooling characteristics of the grooves and those of the lands, whereby information may be recorded stably.

In addition, any focusing errors and tracking errors which are caused during tracking the concave portions and convex portions of the guide grooves and the distortion of the reproduced signal to be generated during the signal demodulation may be compensated for independently.

Thus, the invention described herein makes possible the advantage of providing an optical information recording medium and an optical information recording and reproducing apparatus in which reading errors may be reduced both on the lands and the grooves of the guide grooves.

This and other advantages of the present invention will become apparent to those skilled in the art upon reading and understanding the following detailed description with reference to the accompanying figures.

BRIEF DESCRIPTION OF THE DRAWINGS

FIG. 5 shows the waveforms of the respective signals output from waveform setting portion and a recording state corresponding to the waveforms of the respective signals output from the waveform setting portion according to the first example of the invention.

DESCRIPTION OF THE PREFERRED EMBODIMENTS

Hereinafter, an example of an optical information recording medium and an optical information recording and reproducing apparatus according to the present invention will be described with reference to the accompanying drawings.

Figure 1:
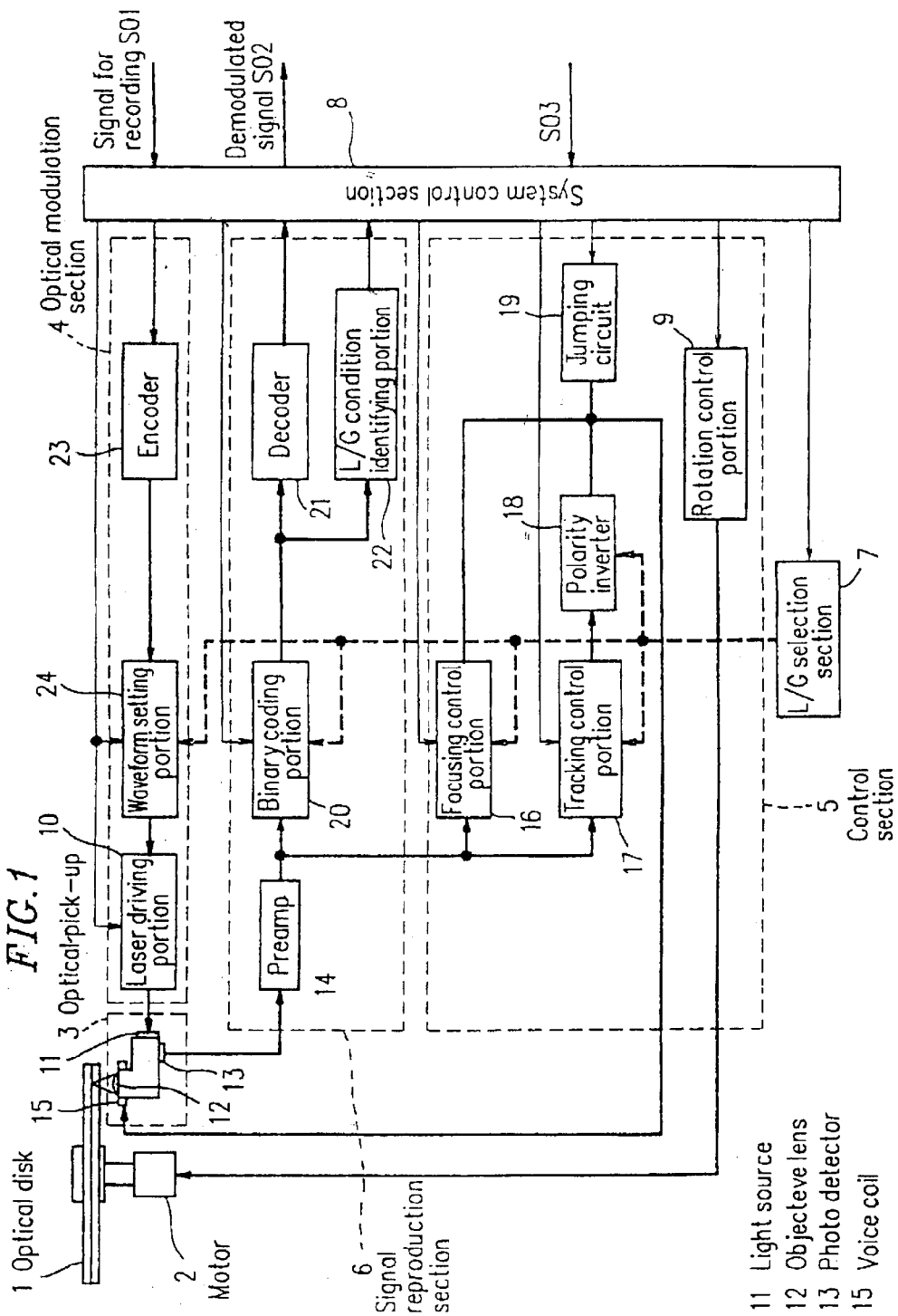
FIG. 1 is a block diagram showing the construction of an optical information recording and reproduction apparatus according to the present invention.

FIG. 1 is a block diagram showing the construction of an optical information recording and reproduction apparatus according to the present invention. The optical information recording and reproducing apparatus of the invention includes: a spindle motor 2 for rotating an optical disk 1, i.e., an optical information recording medium having guide grooves consisting of convex portions and concave portions; an optical pick-up 3 for focusing a light beam emitted from a light source such as a laser light source; and five circuit sections for controlling the respective portions. The first section is an optical modulation section 4 for driving the light source of the optical pick-up 3. The second section is a control section 5 for focusing a light beam emitted from the pick-up 3 and for controlling the operation of the light beam such as a tracking operation on the guide grooves. The third section is a signal reproduction section 6 for reading an information signal formed on the optical disk. At least one of the three sections is provided with at least two kinds of condition setting functions in order to set the conditions optimized for lands and grooves of the guide grooves, respectively. The fourth section is a land/groove selection section 7 (hereinafter, simply referred to as an "L/G selection section") for switching the conditions of the above three sections depending on the portion to be tracked by the light beam, i.e., which of the lands or the grooves are to be tracked. The fifth section is a system control section 8 for controlling the timings of the operations of the above four circuit sections. According to the present invention, in recording and/or reproducing information on/from both of the lands and the grooves on an optical disk, by selecting an optimal condition for the circuit sections using the L/G selection section 7, the information may be recorded and reproduced with reduced errors.

Figure 2:
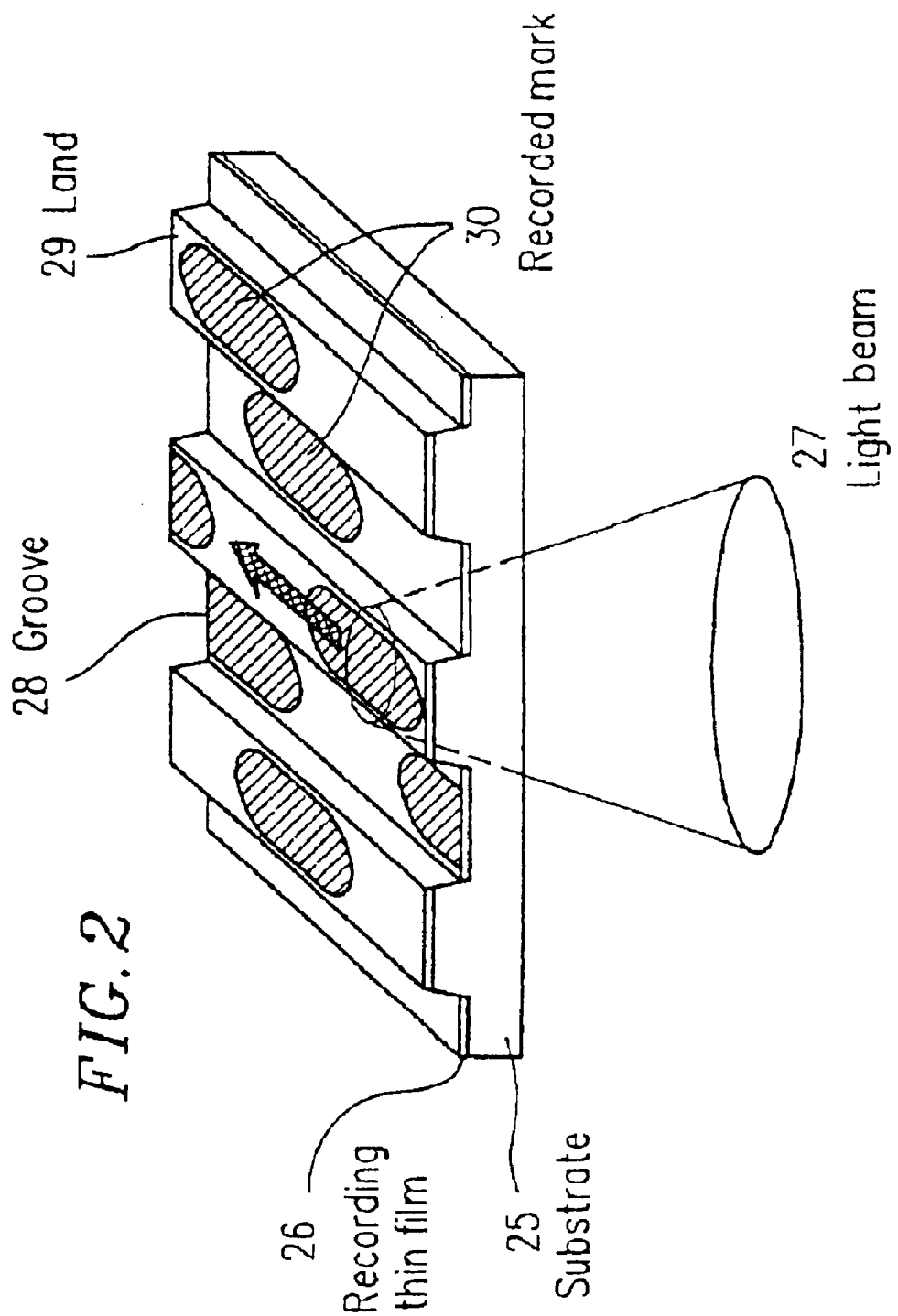
FIG. 2 is a partial perspective view of an optical information recording medium of the present invention.

As shown in FIG. 2, an optical disk 1 includes a substrate 25 having guide grooves thereon consisting of concave portions and convex portions, and a recording thin film 26 causing the variations which can be detected optically. As the recording thin film 26, a deformation type recording thin film accompanying a change of the shape thereof owing to the heat of the light beam; a phase-change type recording thin film utilizing the change of the state in the phase of the thin film; a magnetooptic recording thin film utilizing the variation of the magnetization direction; and a recording thin film made of a photochromic material, or the like in which the recording state changes by the use of the optical energy may be used. Furthermore, information may be reproduced from uneven pits provided in the vicinity of the central portions of the lands and grooves of the guide grooves. In such a case, the medium may be used exclusively for reproducing the information, and the recording of the information thereon is impossible.

Again, referring to FIG. 1, in reproducing the information signals recorded on the optical disk, the spindle motor 2 is driven by a rotation control portion 9 based on the instructions from the system control section 8 so as to rotate the optical disk 1 serving as the recording medium at a constant velocity. Next, control signals indicating that the reproduction operation is being conducted are input from the system control section 8 to a laser driving portion 10, thereby controlling the amount of the, current flowing through the light source 11 so that the intensity of the light beam emitted from the optical pick-up 3 becomes constant. The light beam emitted from the light source 11 is converged through the optical systems of the pick-up 3 and the ultimate objective lens 12 so as to be irradiated on the optical disk 1. The light beam reflected by the optical disk 1 is passed through the objective lens 12 and the optical systems in the pick-up 3 so as to be irradiated on a photodetector 13 having a number of divided light-receiving surfaces. The photodetector 13 photoelectrically converts the incident light beam, thereby outputting a signal having a voltage corresponding to the variation of the light amount received by the respective light-receiving surfaces. The output signal from the photodetector 13 is amplified by a preamp 14. The focal point of the light beam is controlled by using low-frequency components in the amplified signal.

More specifically, a focusing control portion 16 obtains a focusing error signal by using a part of the output signals from the respective light-receiving surfaces of the photodetector 13, and drives a voice coil 15 of the optical pick-up 3 based on the signals, thereby slightly moving the objective lens 12 in the direction vertical to the surface of the optical disk 1, so that the light spot is controlled so as to be focused on the recording thin film of the optical disk 1. On the other hand, the tracking control portion 17 obtains a tracking control signal from the combination of other output signals from the photodetector 13 so that the light beam tracks the guide grooves, and controls the voice coil 15 to move slightly in a radial direction of the optical disk 1.

Then, the polarity of the output from the tracking control portion 17 is inverted by a polarity inverter 18 depending on which of the lands and the grooves are tracked by the light beam. The inversion operation is conducted by the polarity inverter 18 by giving the instructions to the L/G selection section 7 for selecting the conditions of the lands and grooves as well as to the optical modulation section 4 and the signal reproduction section 6 based on the control signal of the system control section 8. Consequently, it becomes possible for the light beam to track the groove portions and the land portions of the guide grooves formed on the optical disk 1.

The quality of a recording medium and the apparatus is fluctuated during the production thereof in the following points. For example, the shapes of the guide grooves may become uniform; the distribution of the intensity of the light beam emitted from the recording and reproducing apparatus may be distorted; or the sensitivity of the photodetector and the like may become inconstant. Accordingly, during the servo operation, an error voltage which is not caused by the recording medium is inadvertently generated in the focusing error signal or a tracking error signal to be generated depending on which of the lands and the grooves on the guide grooves are to be irradiated with the light beam. In order to correct these errors of the control signal, offset adjustment is performed with respect to the respective control portions in association with the setting of the L/G selection section 7. For example, by applying a slight amount of offset to the focusing control signal, the focusing error to be generated between the lands and the grooves is corrected, and in the same way, by applying an offset to the tracking control signal, the tracking error is corrected. An optimal focusing state may be obtained both on the lands and the grooves by employing the above-described construction.

In the case where the light beam is moved to the adjacent track during the tracking operation, a jumping circuit 19 overlaps a pulse voltage for instantaneously moving the voice coil 15 in a radial direction on the output signal of the polarity inverter 18. Hereinafter, it will be assumed that a movement from a groove to an adjacent groove and a movement from a land to an adjacent land are defined as one track jump, and that a movement from a groove to an adjacent land and a movement from a land to an adjacent groove are defined as a half track jump. It is noted that the polarity of the tracking is required to be inverted by the polarity inverter 18 at the same time as the application of the jumping pulse during performing a half track jump. The jumping circuit 19 makes it possible for the light beam to track an arbitrary portion designated by the system control section 8.

A binary coding portion 20 of the signal reproduction section 6 converts a signal output from the preamp 14 into a binary-coded signal by comparing the level of the signal with a reference level using high-frequency components of the signal output from the preamp 14. Then, a decoder 21 demodulates the binary-coded signal in accordance with a predetermined signal format. As a result, an information signal from a recorded mark formed on the optical disk 1 is demodulated so as to be transmitted to an external apparatus as a data signal following the instructions of the system control section 8. Also, if necessary, the recording and reproduction information on the lands and the grooves formed in particular regions on the optical disk 1 is demodulated by an L/G condition identifying portion 22. The information to be recognized by the L/G condition identifying portion 22 is preferably recorded beforehand during the process for producing the recording medium. Such information includes information for correcting the difference between the characteristics of the lands and those of the grooves, information about optimal conditions of the light irradiation for both of the lands and the grooves; information about optimal conditions of the focusing and tracking control; and information about optimal conditions of the demodulation of the reproduced signal. Alternatively, the information may be about the shape of the guide grooves, e.g., the width of a groove, the depth of a groove, the pitch, and the properties on the surface. In such a case, after identifying this value, optimal conditions for recording, servo and reproduction may be obtained based on the correlation predetermined by the information about the shape.

Next, the recording of a signal on a recording medium will be described. First, a difference between a land and a groove during recording will be explained. In almost all kinds of recording media which have been cited herein as optical type recording media, the temperature in a recording thin film increases by absorbing the irradiated light, so that a recorded mark is formed on the thin film in accordance with the variation of the temperature. Therefore, even if the energy of the light for recording is constant, the shape of the recorded mark becomes different depending on the degree of the dissipation of heat in the recording thin film. More specifically, it is considered that the increase in the temperature, the cooling condition after the increase in the temperature, or the like becomes different because of the various differences occurring during the process for forming the guide grooves: that is to say, the difference in the surface state such as the difference between the roughness of a land and that of a groove; the difference in the shapes of the edges of the guide grooves dividing the land and the groove; or the difference between the shape of the guide grooves and that of the recording thin film.

In order to deal with the differences mentioned above, in the case of recording a signal on a recording medium, first, a record signal S01 including the information to be recorded at predetermined timings is input to the optical modulation section 4 by the system control section 8. In the optical modulation section 4, the record signal S01 is first converted into a record signal in a predetermined format by the encoder 23. Then, the division of pulses or the variation of the intensity is set with respect to the converted signal in accordance with the conditions determined by the waveform setting portion 24. Next, the light intensity of the light source 11 is modulated by the laser driving portion 10. The intensity-modulated light is absorbed by the recording thin film on the optical disk 1, whereby a recorded mark is formed and the signal recording is performed. The waveform setting portion 24 has the recording patterns optimized for recording a signal on a land and a groove, and the portion 24 is synchronized with the output of the L/G selection section 7 so as to vary the output thereof. As a result, the light intensity of the light source 11 may be modulated by the laser driving portion 10 based on the modulated waveforms corresponding to a land and a groove, respectively.

By using the construction described above, it is possible to record a signal on a recording thin film on the conditions optimized for both of the land and the groove, or to reproduce the information signal recorded in such a way. Hereinafter, exemplary embodiments illustrating specific operations will be described in detail below.

EXAMPLE 1

Figure 3:
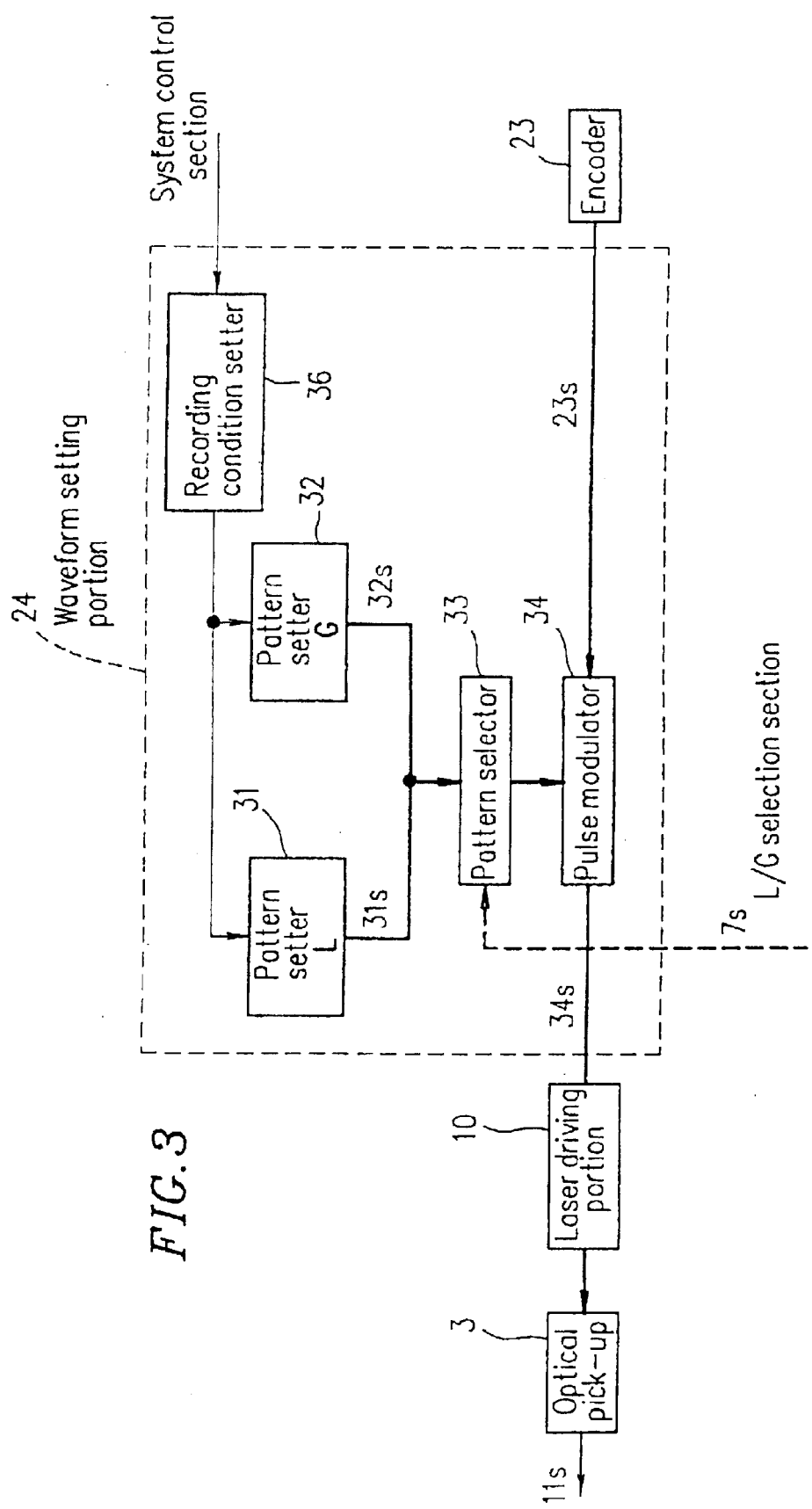
FIG. 3 is a block diagram showing the construction of a waveform setting portion according to a first example of the invention.
Figure 4A:
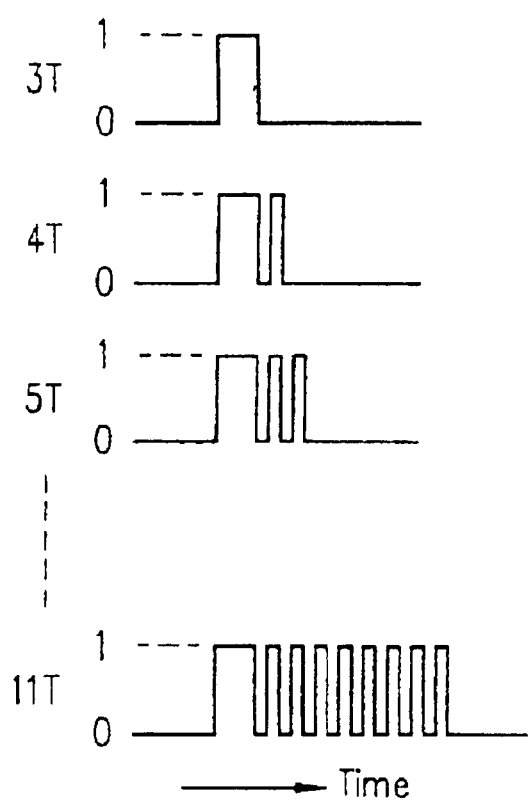
FIGS. 4A and 4B show the waveforms of the respective signals output from pattern setters according to the first example of the invention.
Figure 4B:
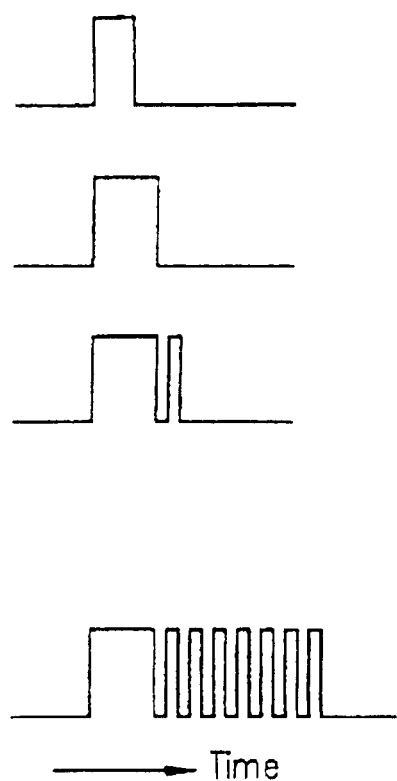

In this example, a method for setting respectively independent recording conditions for a land and a groove during the recording of an information signal on an optical information recording medium will be described. By switching the modulating waveform of the light during recording depending on which of the two portions, i.e., a land portion and a groove portion, is a signal recording face, the difference between the thermal conditions on a land and those on a groove is compensated, thereby obtaining less distorted recorded marks on both of the portions. FIG. 3 shows the construction of the waveform setting portion 24 in the optical modulation section 4. FIGS. 4A and 4B show the patterns set by the waveform setting portion 24. FIG. 4A shows the patterns to be used in recording a signal on a land, while FIG. 4B shows the patterns to be used in recording a signal on a groove. FIG. 5 is charts showing the relationship between the light output from the optical pick-up 3 based on the signal input to the optical modulation section 4 and the signal output from the optical modulation section 4 and the timings of the recorded marks to be recorded on the optical information recording medium.

As shown in FIG. 3, the waveform setting portion 24 described referring to FIG. 1 includes: pattern setters 31 and 32 having in the memories thereof the reference pulse patterns 31s and 32s to be applied to a land and a groove, respectively; a pattern selector 33 for selecting either one of the two patterns; and a pulse modulator 34 for converting a coded signal into a pulse pattern. Since the L/G selection section operates depending on which of the two portions is a signal recording portion, based on the output signal 7s from the L/G selection section, the pattern selector 33 selects either the pulse pattern of the output signal 31s from the pattern setter 31 or that of the output signal 32s from the pattern setter 32. The pulse modulator 34 outputs a modulated pulse 34s corresponding to the inversion intervals of the coded signal 23s output from the encoder 23, based on the output pattern from the pattern selector 33. The pulse modulator 34 outputs to the laser driving portion 10 a waveform varying among the three voltage levels Vp, Vb and Vr corresponding to the respective irradiation powers Pp, Pb and Pr of the light beam focused on the optical information recording medium. The laser driving portion 10 converts a voltage of the output signal 34s from the pulse modulator 34, into a current, thereby modulating the light source 11. As a result, the optical pick-up 3 emits a light beam having a predetermined output waveform 11s, so that predetermined information is recorded on the optical information recording medium 1.

In FIGS. 4A, 4B, and 5, the parameters included in the pulse patterns which the pulse modulator 34 receives are indicated only by the dispositions of the pulses and the widths of the pulses. However, the parameters may be effectively indicated by varying the intervals between the pulses and the heights (irradiation powers) of the pulses. Particularly, in the case where the shapes of the recorded marks formed on the land and the groove on the recording medium are equivalent, but the areas thereof are different from each other, or in the case of employing a modulation method which is not so affected by the difference in the shapes of the recorded marks, it is sufficient to set the irradiation powers at the values corresponding to a land and a groove, respectively. In such a case, the structure of the setting circuit may be considerably simplified.

The pulse patterns to be set by the pattern setters 31 and 32 as shown in FIGS. 4A and 4B correspond to the case where the pulses are intensity-modulated based on the level of the output 23s from the encoder 23, i.e., a mark length recording. The pulse patterns may also correspond to the case where the pulses are generated every time the level of the output 23s from the encoder 23 is inverted, i.e., a mark position recording.

In the case corresponding to the mark length recording, a multiple pulse modulation method for forming a plurality of pulse sequences with respect to the inversion of a single signal as shown in FIG. 5 is employed. This method is utilized for preventing the distortion of the recorded mark because of the heat transfer when an optical information recording medium is irradiated with the light. More specifically, the energy density in the portion where the signal is inverted, i.e., the starting point of the recording, is set to be high, while the energy density thereafter is set to be low, whereby a symmetrically recorded mark may be recorded. As a result, the temperature of the recording thin film becomes substantially constant between the starting point and the terminal point of the recording, thereby obtaining a symmetrically recorded mark. However, in a land and a groove, even if the irradiation conditions of the light are the same, the heating/cooling conditions of the recording film are different from each other, as described above. Thus, according to the present invention, the pulse patterns are set so as to optimize the irradiation conditions of the light for the two portions. For example, in the case where the encoder 23 corresponds to an EFM (eight to fourteen modulation) converting used for a compact disk, etc., the number of the inversion intervals of the signal 23s becomes nine, i.e., from 3T to 11T, where T is a period of clock. In this case, as shown in FIGS. 4A and 4B, the nine kinds of set patterns to be recorded on a land and a groove are stored in the pattern setters 31 and 32, respectively. Then, the nine kinds of patterns read from the pattern setters 31 and 32 are output from the pattern selector 33; and the patterns are input to the pulse modulator 34, where a pattern having a cycle corresponding to the inversion interval of the output 23s from the encoder 23 is selected.

On the other hand, in the case of the mark position recording, the shapes of the recorded marks to be formed on the two portions on the optical information recording medium are the same, and the interval thereof becomes an information signal, so that it is sufficient for the pattern setters 31 and 32 to set only one kind of pulse pattern consisting of a pulse width and a power value for the land and the groove, respectively. Accordingly, the structure of the pattern setter may be simplified as compared with the case of the mark length recording.

In the method described above, the pulse patterns corresponding to a land and a groove are stored beforehand inside the memories of the pattern setters 31 and 32. On the other hand, in the case where different pulse patterns are employed for different kinds of recording media, and in the case where a recording is intended to be performed with an even higher precision, the following two methods are employed.

Figure 6:
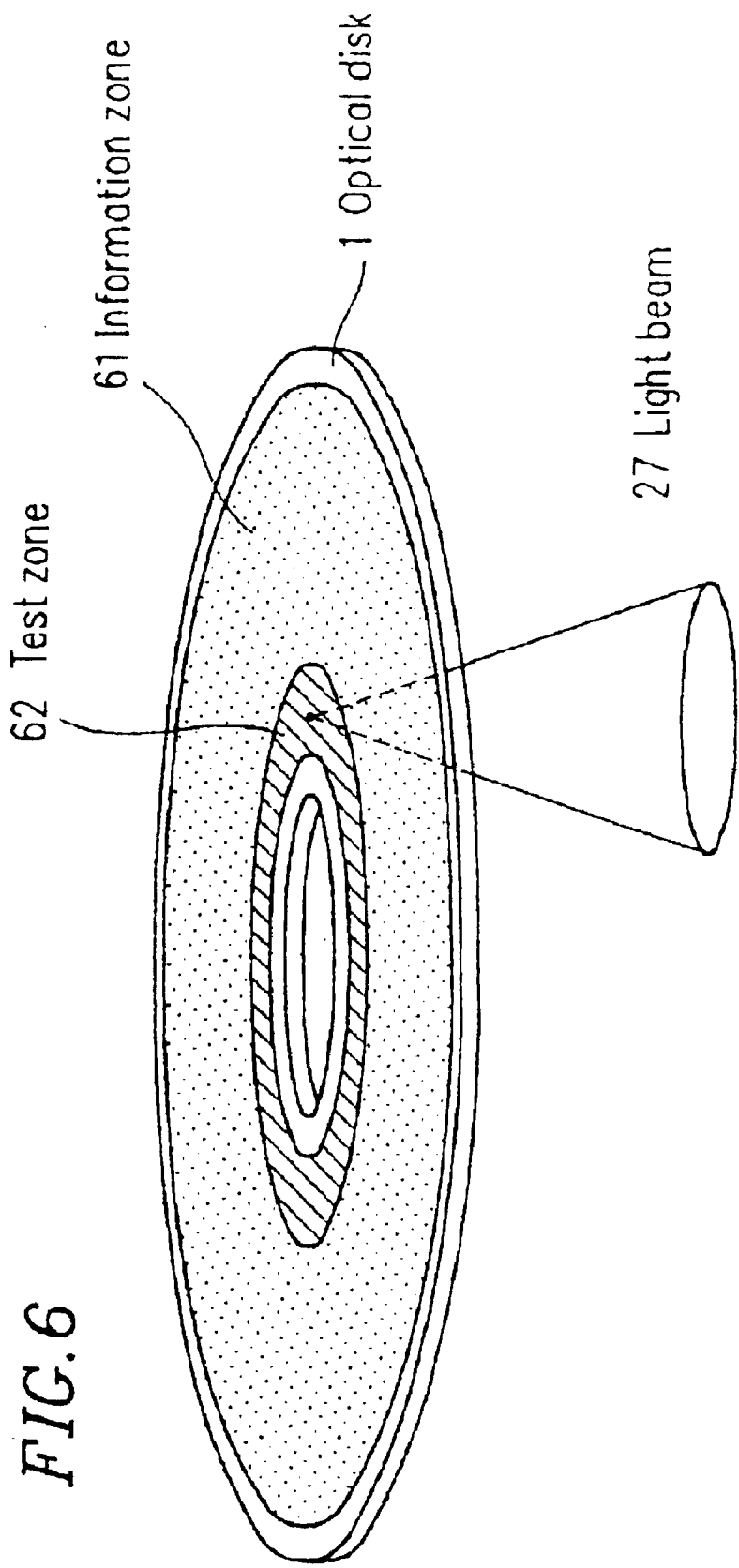
FIG. 6 is a perspective view showing a configuration for an optical information recording medium according to the first example of the invention.
Figure 7:
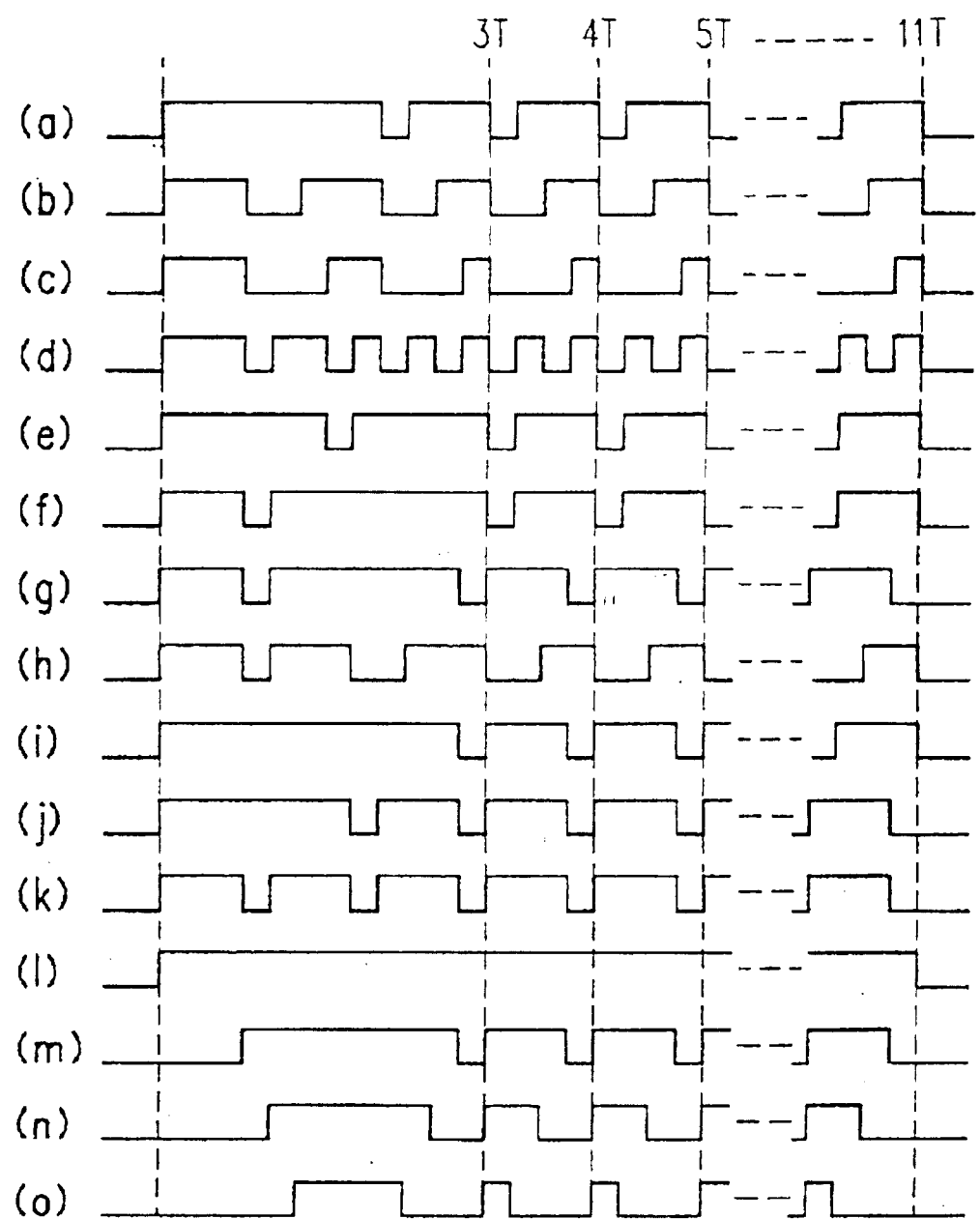
FIG. 7 shows the waveforms of the respective signals output from a recording condition setter according to the first example of the invention.
Figure 8:
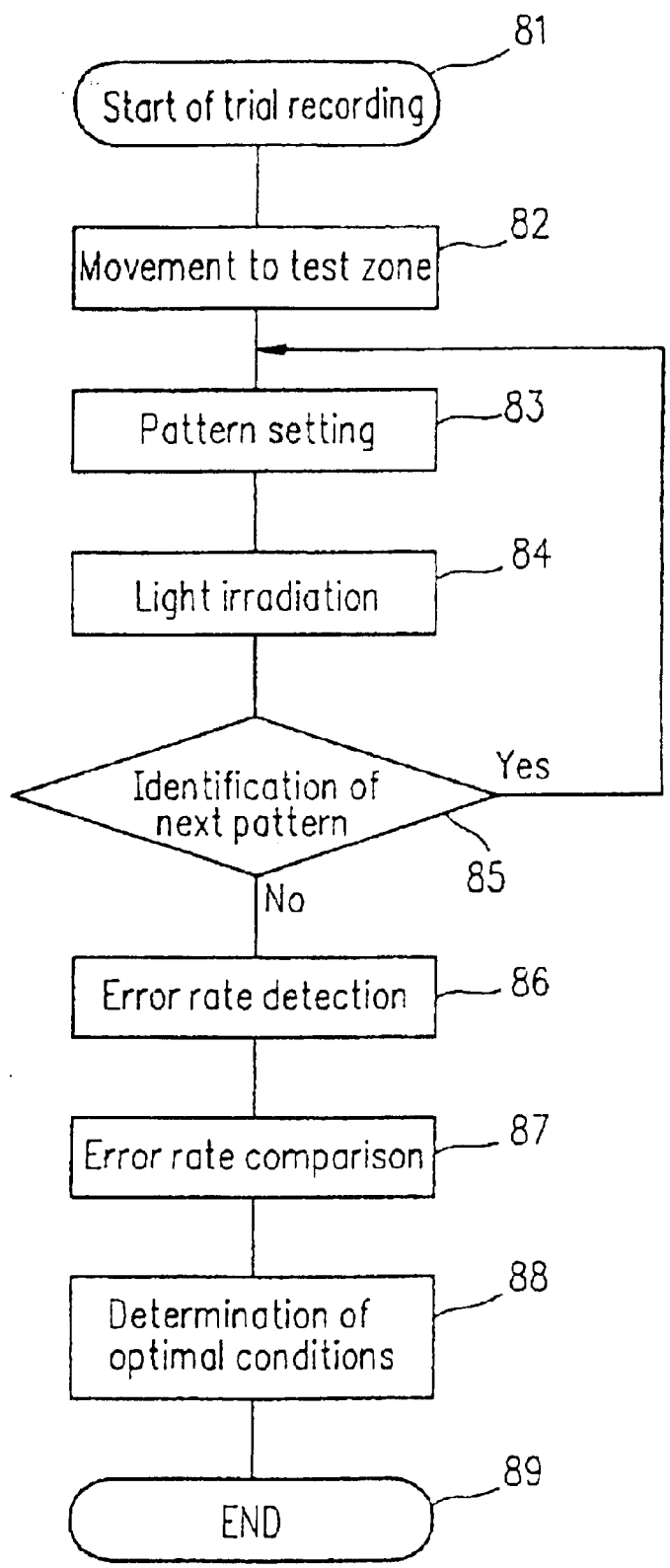
FIG. 8 is a flow chart showing the process in setting a recording condition according to the first example of the invention.

According to a first method, a trial recording is performed before recording the information signal. Various differences between a land and a groove including the difference between optical information recording media; the difference between recording and reproducing apparatuses; the variation of the ambient temperature around the recording and reproducing apparatus; the adhesion of dust to a recording medium or an optical system, and the like are corrected. In this case, every time a variation factor varying the recording conditions of a recording medium is detected, a trial recording is performed so as to select an optimal pulse pattern, thereby resetting the pulse pattern. FIG. 8 is a flow chart illustrating the trial recording process. FIG. 6 is a perspective view of an optical disk. FIG. 7 shows the various pulse patterns used for the trial recording process. Hereinafter, the trial recording process will be described with reference to FIG. 6 through FIG. 8.

The trial recording process is begun by the input of a reference signal S03 indicating the generation of a variation factor in the optical information recording medium to the system control section 8, as shown in FIG. 1. As shown in FIG. 8, the trial recording is begun by the instruction 81 indicating the start of the trial recording from the system control section 8. As shown in FIG. 6, following the instruction 82 indicating the movement of the light beam 27 to the test zone 62 on the optical disk 1, the position of the light beam 27 used for recording and reproduction is moved to the test zone 62 close to the information zone 61 on the same plane of the optical disk 1. Next, following the instruction 83 indicating the pattern setting, a first pulse pattern in the recording condition setter 36 (shown in FIG. 3) in which a plurality of pulse patterns are stored is read into the pattern setters 31 and 32. Next, in accordance with the recording pattern, the driver 10 is operated (as shown in FIG. 1), and, following the instruction 84 indicating the light irradiation, a modulated light is first irradiated on a groove. Subsequently, in the same way, a series of light irradiation steps are performed on a land. The recording condition setter 36 sets various pulse patterns in which the energy distribution at the starting point of the recording is different from that to be obtained after the point in order to obtain a symmetrically recorded mark with respect to various recording media and various environmental conditions during the operation of the apparatus, as indicated by the 15 exemplary pulse patterns of 11T in FIG. 7. These pulse patterns (15 pulse patterns in this example) are sequentially output depending on the result determined by the identification test 85 of the next pulse pattern. As a result, the recorded marks in respectively different shapes corresponding to the recording conditions are formed on the recording medium. Next, a signal is reproduced from the recorded marks on the recording medium. During the reproduction of the signal, the error rate of each signal reproduced from each recorded mark is detected in the error detection step 86, and the detected values are compared with each other in the error rate comparison step 87, whereby an optimal recording condition is obtained. The error rate is detected by using the error correction signal generated during the demodulation of the data by the decoder 20. The error rates are compared with each other by the system control section 8 so as to obtain a recording condition where the error rate becomes minimal. As a result, an optimal pattern may be selected. By performing the trial recording process for each of the land and the groove, a pulse pattern optimized for each of the land and the groove may be obtained.

In the case where the time required for this trial recording process is desired to be shortened, or in the case where the construction of the circuit is desired to be simplified, some of these steps may be omitted. For example, the correlation between a land and a groove is obtained beforehand, and the trial recording is performed only for the land, thereby obtaining a pulse pattern optimized for the land. Then, based on the correlation mentioned above, a pulse pattern for a groove may be obtained.

The recording condition setter 36 should be operated based on the reference signal S03, for example, when the optical disk is exchanged; when the disk drive is actuated; when the temperature of the operating environment has been varied by a predetermined amount or more; when a predetermined time period has passed after setting the recording conditions; or when a predetermined amount or more of error has been detected from a reproduced signal. When the disk is exchanged, or when the drive is actuated, the variation factors in each of the disk and the drive, or those between the disk and the drive may be detected. By managing the variation of the temperature of the operating environment and the time period passed after setting the recording conditions, the dependence of the recording medium on the temperature, or the variation of the controlled state of the drive may be compensated.

According to a second method, a recording condition optimized for each of a land and a groove, i.e., an identifier indicating an optimal recording condition, is recorded in a predetermined region on the optical information recording medium. An identifier includes information of pulse patterns optimal for both of a land and a groove, and is provided in a form based on that of an information signal or that of an address signal in an internal region or an external region other than the information zone of the optical disk. The identifier may be provided, for example, in a region corresponding to the test zone 62 adjacent to the information zone 61 on the same plane of the optical disk 1 as shown in FIG. 6. In such a case, the form of the identifier may be the same as that of an information signal, however, in view of the improvement of the reading accuracy, the identifier is preferably a coded signal having a relatively low recording density as compared with that of the information signal, and the identifier is preferably provided in either a land or a groove of the guide grooves. The identifier in such a form is processed in the signal reproduction section 6 in the same way as the information signal, and the information included in the identifier is demodulated by the L/G condition identifying portion 22 after the reproduced signal is binary-coded at a predetermined level. Based on the results, the system control section 8 sets the recording conditions for the optical modulation section 4.

The identifier may be provided in various other forms in accordance with the size of the apparatus to be used: for example, the identifier may be provided in a part of a protection plate or a cartridge for protecting the medium; the identifier may be provided by printing information; a particular shape may be used for the identifier; or a semiconductor memory may be provided for functioning as the identifier. When the information from these identifiers is supplied to a recording and reproducing apparatus through an optical information recording medium, the information is read out by the system control section 8, so that the patterns to be output from the pattern setters 31 and 32 are set based on the contents of the information. By using the above-mentioned construction, the irradiation conditions of the light may be set so as to be optimized for the kind of the recording medium to be used.

According to the construction described above, every time a reference signal for setting the recording conditions of an optical disk is output, the recording conditions are reset, so that the recording of the data may always be performed in an optimal state, and the reliability as a data recording apparatus may be improved.

EXAMPLE 2

In this example, a method for enabling the focusing to be optimized for both a land and a groove and optimal tracking of the guide grooves by switching the servo conditions for a land and a groove when a light beam is irradiated on an optical information recording medium.

As focusing techniques for focusing a light beam on an optical information recording medium, a knife edge method, an astigmatism method and the like are known. According to the knife edge method, the detection system to be used becomes disadvantageously large because the optical members are required to be positioned with high precision. On the other hand, according to the astigmatism method, it is easy to downsize a detection system. According to the astigmatism method, however, in performing a precise focusing control for both of a land and a groove, which is the main objective of the present invention, a difference is not supposed to be generated between a land and a groove in an ideal state. But, in actuality, if slight distortion is present in the shape of the guide grooves or in the shape of a beam spot, the distribution of the light beam reflected by the recording medium is affected by the distortion, so that the patterns on the photodetector 13 become different. According to the method of the present invention, the difference in the shapes of the beam spots on the photodetector 13 for each of a land and a groove is compensated by applying an offset to a focusing control signal.

Figure 9:
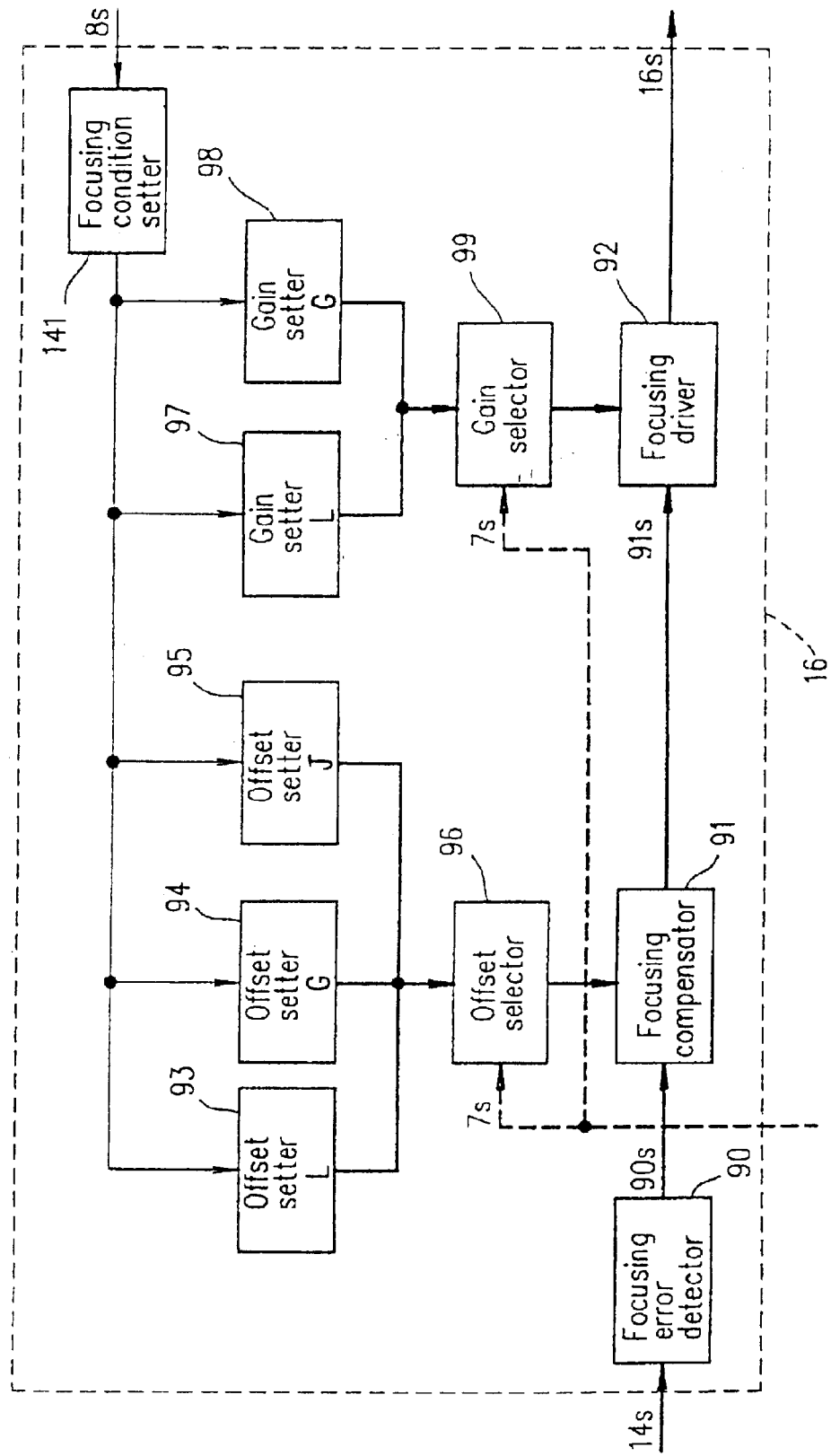
FIG. 9 is a block diagram showing the construction of a focusing control portion according to a second example of the invention.

FIG. 9 shows the detail of a focusing control portion 16. A focusing error signal 90s is obtained by the focusing error detector 90 based on the signal components of the output signal 14s from the preamp which relate to the focusing control. The focusing error signal 90s is input through a focusing compensator 91 to a focusing driver 92, thereby obtaining a focusing control signal 16s. Then, by driving the voice coil 15 of the optical pick-up 3 based on the focusing control signal 16s, the focusing control may be performed.

The focusing compensator 91 is constructed so as to set a plurality of offset levels in response to the signals externally applied. The offsets to be input to the focusing compensator 91 are generated in an offset setter 93 for setting an offset when a land is tracked; an offset setter 94 for setting an offset when a groove is tracked; and an offset setter 95 for setting an offset when a half track jump operation is performed from a land to a groove, or from a groove to a land. The offset selector 96 outputs either a signal from the offset setter 93 or a signal from the offset setter 94 in response to the output 7s from the L/G selection section 7. In the case where the instruction indicating a half track jump is input to the offset selector 96 from the system control section, the level of the output from the offset selector 96 becomes equal to the level of the output from the offset setter 95.

The setting of the offset of the half track jump is performed for stabilizing the operation before and after the track jump when the difference between the levels of the offset setter 93 and those of the offset setter 94 is considerably large. On the other hand, in the case where the difference in the levels is small, the offset setting operation may be omitted. The focusing driver 92 outputs a signal for offsetting the input signal 91s thereto so as to reduce the level of the signal 91s to zero, thereby driving the voice coil 51. The gain used for this focusing driver 92 is generated in a gain setter 97 for setting a gain when a land is tracked, and in a gain setter 98 for setting a gain when a groove is tracked. A gain selector 99 outputs either a signal from the gain setter 97 or a signal from the gain setter 98 in response to the output 7s from the L/G selection section 7. By using the above-mentioned construction, a focusing state optimized for both a land and a groove may be set.

Figure 10:
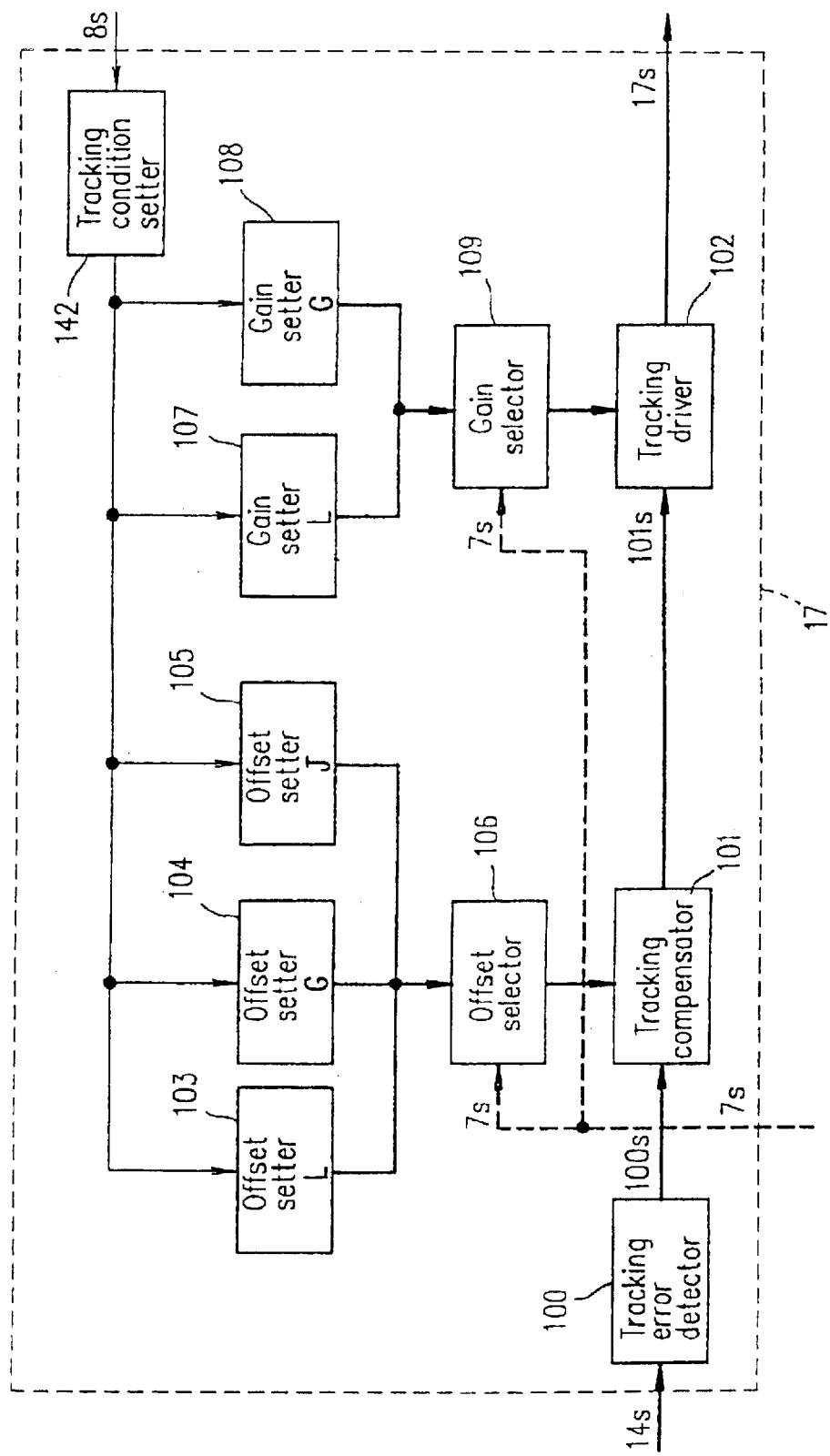
FIG. 10 is a block diagram showing the construction of a tracking control portion according to the second example of the invention.

In controlling the tracking, it becomes possible to record and reproduce more satisfactorily if setting a state optimized for both of a land and a groove. FIG. 10 shows the detail of the tracking control portion 17. A tracking error signal 100s is output from a tracking error detector 100 based on the signal components of the output signal 14s from the preamp which relate to the tracking control. The tracking error signal 100s is input through a tracking compensator 101 to a tracking driver 102 so as to output a tracking control signal 17s. The tracking error signal 17s is input to a polarity inverter 18 so as to drive the voice coil 15 of the optical pick-up 3, thereby controlling the tracking.

The tracking compensator 101 is constructed so as to set a plurality of offset levels in response to a signal externally applied. The offsets to be input to the tracking compensator 101 are generated in an offset setter 103 for setting an offset when a land is tracked; an offset setter 104 for setting an offset when a groove is tracked; and an offset setter 105 for setting an offset when a half track jump operation is performed from a land to a groove, or from a groove to a land. The offset selector 106 outputs either a signal from the offset setter 103 or a signal from the offset setter 104 in response to the output 7s from the L/G selection section. 7. In the case where the instruction indicating a half track jump is input to the offset selector 106 from the system control section, the level of the output from the offset selector 106 becomes equal to the level of the output from the offset setter 105.

The setting of the offset during the performance a half track jump is employed for stabilizing the operation before and after the track jump when the difference between the levels of the offset setter 103 and those of the offset setter 104 is considerably large. On the other hand, in the case where the difference in the levels is small, the offset setting operation may be omitted.

The tracking driver 102 outputs a signal for offsetting the input signal 101s thereto so as to reduce the level of the signal 101s to zero, thereby driving the voice coil 15. A gain used for this tracking driver 102 is generated in a gain setter 107 for setting a gain when a land is tracked, and in a gain setter 108 for setting a gain when a groove is tracked. A gain selector 109 outputs either a signal from the gain setter 107 or the signal from the gain setter 108 in response to the output 7s from the L/G selection section 7. By using the above-mentioned construction, a tracking state optimized for both a land and a groove may be set.

Also, in order to set an optimal focusing condition or an optimal tracking condition, the recording and reproduction operation may be performed while varying gradually the servo conditions before recording and reproducing a signal in the same way as the trial-write operation as described in Example 1. This process may be performed in almost the same procedures as those of the trial-write process as described with reference to FIG. 8.

Figure 11:
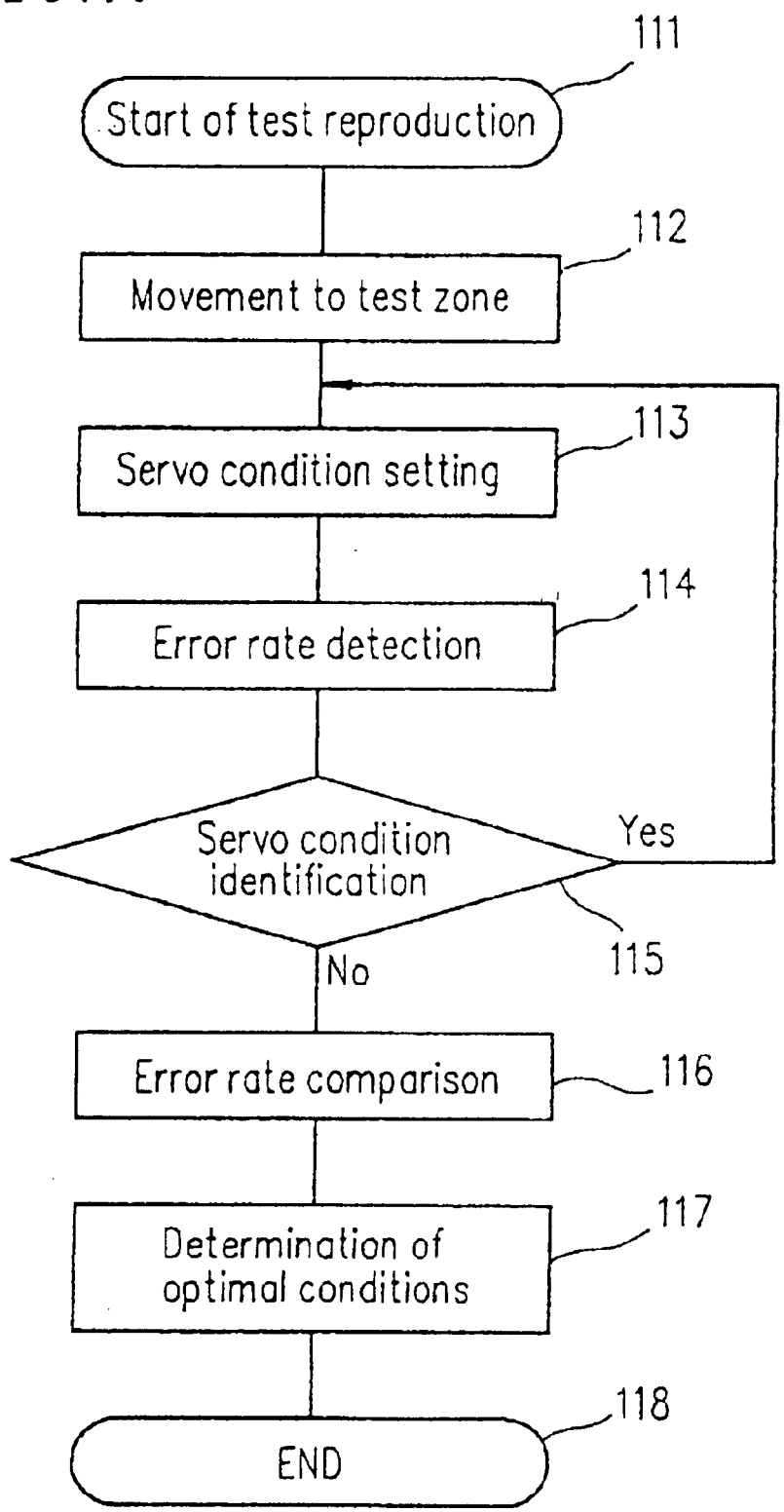
FIG. 11 is a flow chart showing the process in setting a servo condition according to the second example of the invention.

In setting a focusing condition, as shown in FIG. 9, a system control signal 8s is input via a focusing condition setter 141 to the offset setters 93, 94 and 95 and the gain setters 97 and 98. As shown in FIG. 11, following the instruction 111 indicating the start of the test reproduction, the light beam is moved to the test zone on the optical disk as indicated by 112, so that the reproduction of the signal is begun by scanning a track on which reference recording marks have been recorded beforehand. Next, in the servo condition setting step 113, a focusing offset and a focusing gain are selected based on the signal output from the focusing condition setter 141. Then, in the error rate detection step 114, the signal is demodulated so as to estimate the error rate. Next, in the servo condition identification step 115, the next servo condition for the servo condition setter 141 is identified. If there remains any set conditions which are yet to be executed, then the servo condition setting step 113 is repeatedly performed, thereby executing all the set conditions. The obtained results are compared with each other in the error rate comparison step 116, thereby determining an optimal focusing condition.

In setting a tracking condition, as shown in FIG. 10, a system control signal 8s is input via the tracking condition setter 142 to the offset setters 103, 104 and 105 and the gain setters 107 and 108. An optimal tracking condition is determined in the procedures shown in FIG. 13.

In this example, a method for reproducing reference recording marks recorded beforehand in the test zone has been described. The servo conditions during recording may be obtained by performing a trial recording process in the test zone where these servo conditions are modified and by demodulating the reproduced signals from the respective trial recorded marks. In such a case, it is sufficient to additionally perform a light irradiation step for recording between the servo condition setting step 113 and the error rate detection step 114. There often exists a slight difference between an optimal servo condition thus obtained during recording and an optimal condition during reproduction. In order to eliminate the effect of such a difference, depending on necessity, either of the two values is adopted or the servo conditions are switched in the recording and in the reproduction. By using the above-described construction, it becomes possible to record on the land and the groove so as to correspond to the variation between the disks or the variation of the recording and reproducing apparatus.

EXAMPLE 3

In this example, a method for switching demodulation conditions for a land and a groove when an information signal is demodulated based on the reflected light from the light beam irradiated on the optical information recording medium by omitting or simplifying a step in which the recording conditions are switched for a land and a groove during recording. The objective of the method of this example is to correct the difference in the signal amplitude and the difference in the mark length dependence of the signal amplitude among various differences between the reproduced signal of a land and that of a groove. It is noted that the mark length difference refers to an amplitude dependence between a shortest recorded mark and a longest recorded mark among the recorded marks to be formed in response to the information signal.

Figure 12:
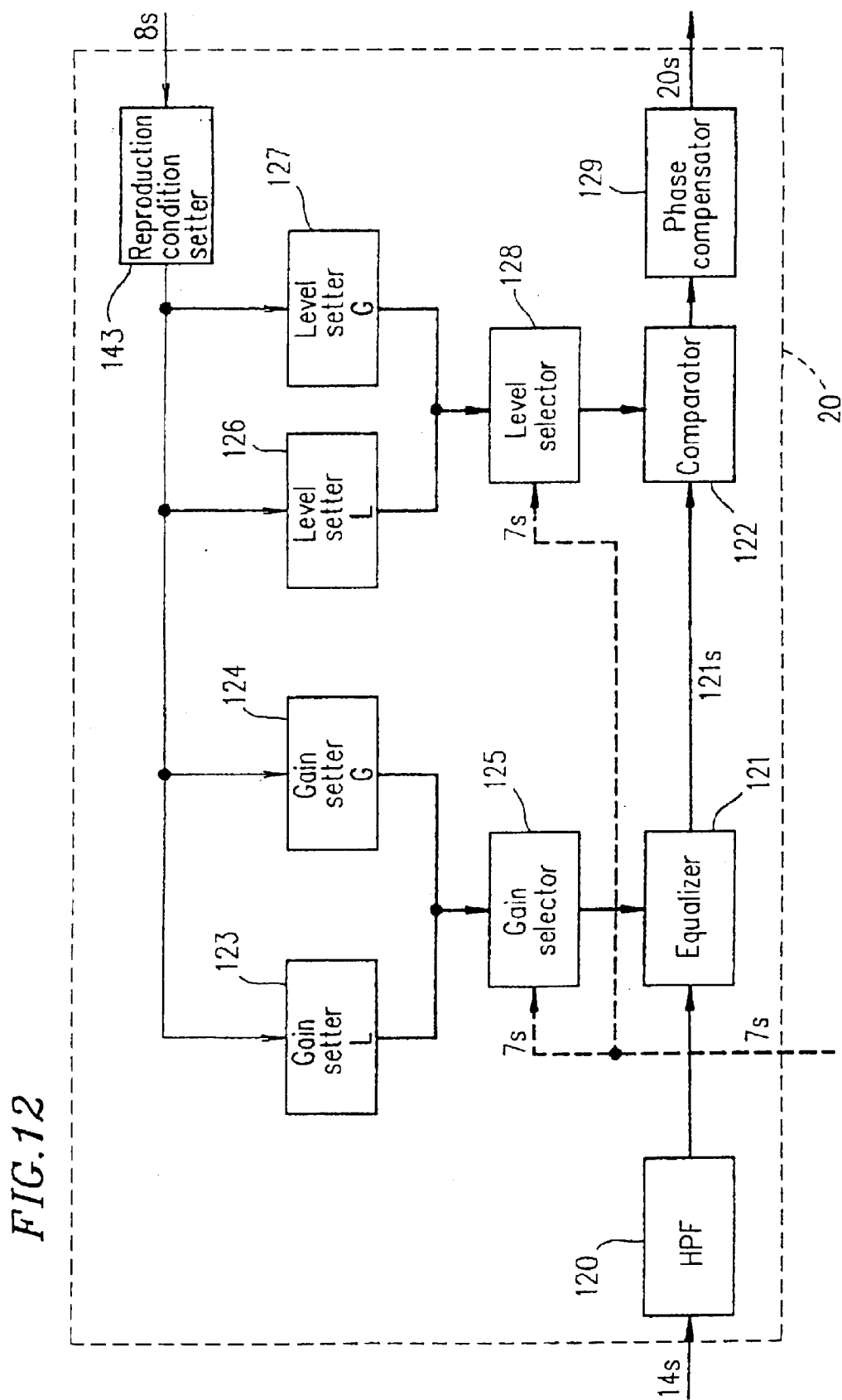
FIG. 12 is a block diagram showing the construction of a binary coding portion according to a third example of the invention.

FIG. 12 shows the detail of the binary coding portion 20. A high-pass filter (HPF) 120 outputs high-frequency components of the output signal 14s from the preamp. The high frequency-components of the signal bands of the signal output from the HPF 120 are further amplified by the equalizer 121 so as to be output as the signal 121s. The signal 121s is transmitted through a comparator 122 and a phase compensator 129 so as to be input to a decoder 21 as a binary-coded signal 20s, so that the information signal is demodulated. The binary-coded signal 20s is also input to the L/G condition identifying portion 22, thereby monitoring the reproduction state.

The equalizer 121 is constructed so as to arbitrarily set the frequency band of the equalizing and the equalizing characteristics such as a gain in response to the signal externally applied. The equalizer 121 is connected via a gain selector 125 to a gain setter 123 for setting a gain when a land is tracked, and a gain setter 124 for setting a gain when a groove is tracked. The gain selector 125 outputs one of the values set by the gain setters 123 and 124 to the equalizer 121 based on the output 7s from the L/G selection section 7. The equalizer 121 equalizes the signal passed through the HPF 120 based on the set gain received from the gain selector 125 thereby outputting the signal as the signal 121s.

The comparator 122 compares the level of the signal 121s with a reference level, thereby outputting the obtained binary coded signal to the phase compensator 129. The phase compensator 129 compensates the phase of the binary coded signal, thereby outputting the signal as the phase-compensated binary-coded signal 20s. The slice level to be used as a reference level for the comparator 122 is set in the level setter 126 for setting a level when a land is tracked and in the level setter 127 for setting a level when a groove is tracked. The level selector 128 outputs either one of the values set by the level setters 126 and 127 to the comparator 122 based on the output 7s from the L/G selection section 7, thereby supplying a reference level to the comparator 122. By using the above-described construction, the reproduced signal is binary-coded at an optimal slice level for both a land and groove. By processing the information signal recorded on the land and the groove in the respectively independent conditions, it becomes possible to reduce the difference between the recording characteristics on a land and those on a groove.

Also, it is effective to provide a reproduction condition setting step for setting reproduction conditions beforehand in the same way as the trial recording process as described in Example 1 as a method for setting an optimal equalizing condition or an optimal slice condition. In performing this step, the procedures based on those of the trial-write process as described with reference to FIG. 8 may be used. In the case of setting the reproduction conditions, as shown in FIG. 12, the system control signal 8s is input via the reproduction condition setter 143 to the gain setters 123 and 124 and the level setters 126 and 127.

Figure 13:
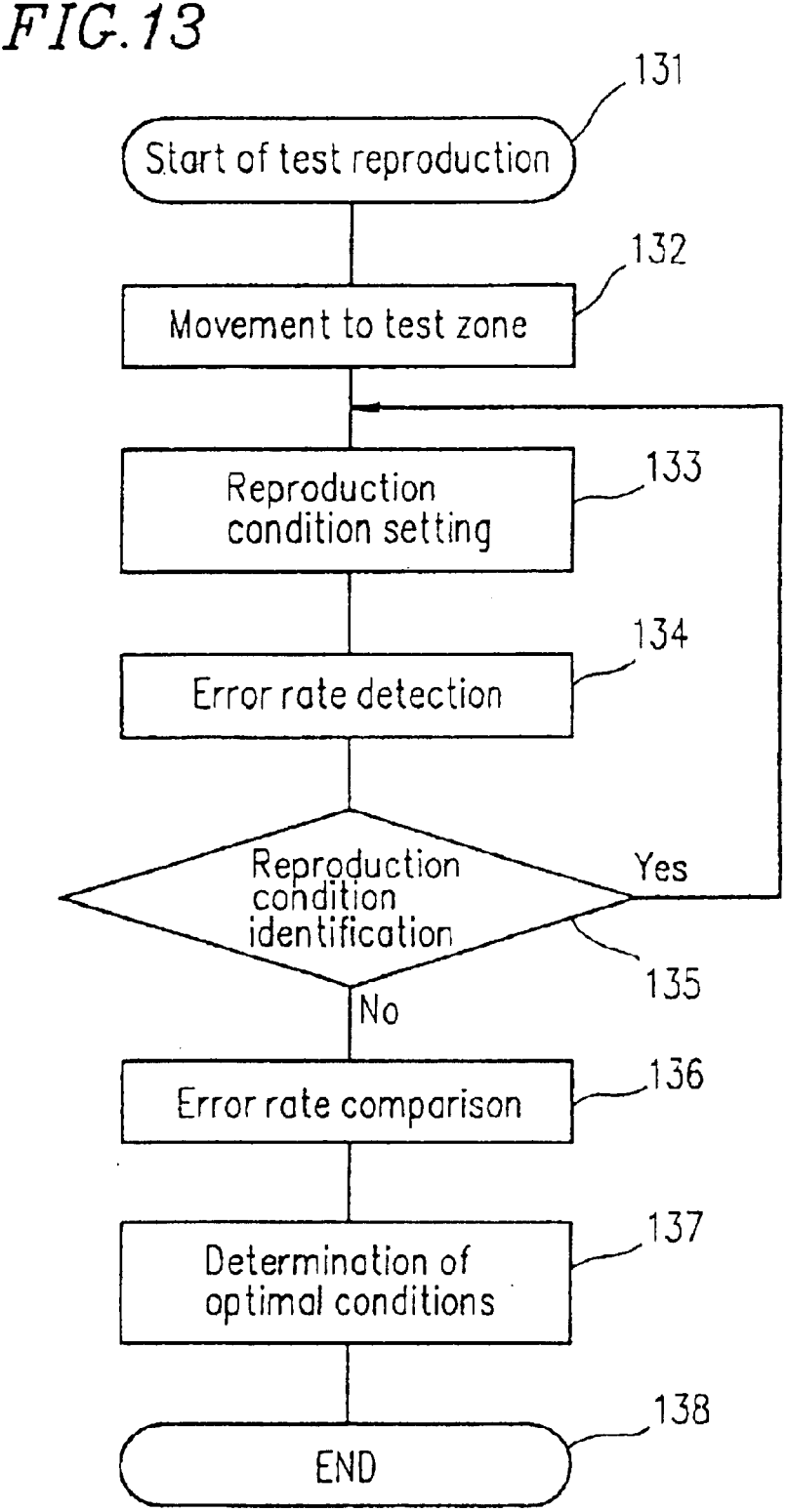
FIG. 13 is a flow chart showing the process in setting a reproduction condition according to the third example of the invention.

As shown in FIG. 13, following the instruction 131 indicating the start of the test reproduction, the light beam is moved to the test zone on the optical disk, so as to start the reproduction of the signal by scanning the track on which reference recording marks have been recorded beforehand. Subsequently, in the reproduction condition setting step 133, an equalizing characteristic and a slice level are set based on the signal output from the reproduction condition setter 143. Then, the signal is demodulated in the error rate detection step 134 so as to evaluate the error rate. The next reproduction condition for the reproduction condition setter 143 is identified in the reproduction condition identification step 135. If there remains any reproduction condition which are yet to be performed, then the reproduction condition setting step 133 is repeatedly performed, thereby performing all the set conditions. The obtained results are compared in the error rate comparison step 136, thereby determining an optimal reproduction condition.

By using the above-mentioned construction, it becomes possible to reproduce the signals recorded on a land and a groove in response to the variation between the respective disks or the variation of the recording and reproducing apparatus. In addition, by additionally providing a recording condition setting step as described in Examples 1 and 2 before the reproduction condition setting step, the quality of the recording and reproducing apparatus may be further improved.

In Examples 1 through 3, the recording medium has not been described in detail. However, the present invention is applicable to all kinds of recording media which exhibit recording conditions to be detected optically. The depth-of the groove serving as a parameter of the shape of a groove, and the angle of the inclined regions in the borders between lands and grooves have not been described in detail. However, these are not restrictions of the present invention, either.

The present invention has been described with respect to the optical modulation section in Example 1; the control section in Example 2; and a method for compensating the differences between the characteristics of a land and those of a groove without any relation to the signal reproduction section. It is clear that the above-mentioned conditions may be used in free combinations thereof or in simplified forms in accordance with the characteristics of the recording medium and the necessary level of the signal to be output from the recording and reproducing apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information recording and reproduction method for irradiating with an optical beam a recording medium including a recording film on a substrate having a guide groove including a concave portion and a convex portion, so as to perform recording and reproduction for a signal to and from both the concave portion and the convex portion of the guide groove, wherein the recording for the signal is performed to the concave portion and convex portion based on a result of demodulation of an identifier which represents a recording condition for each of the convex portion and the concave portion of the recording medium.

2. An optical information recording and reproduction method according to claim 1, wherein the identifier identifies a system of irradiating one recording mark which has been recorded with light inducing a plurality of pulse sequences, and includes information including a predetermined modulation pattern for each of the concave portion and the convex portion of the guide groove.

3. An optical information recording and reproduction method according to claim 1, wherein the identifier includes information including a predetermined recording power value for each of the concave portion and the convex portion of the guide groove.

* * * * *